Dec. 15, 1953  P. INGRAM  2,662,760
SLUG FEED DEVICE
Filed Aug. 27, 1949  2 Sheets-Sheet 1
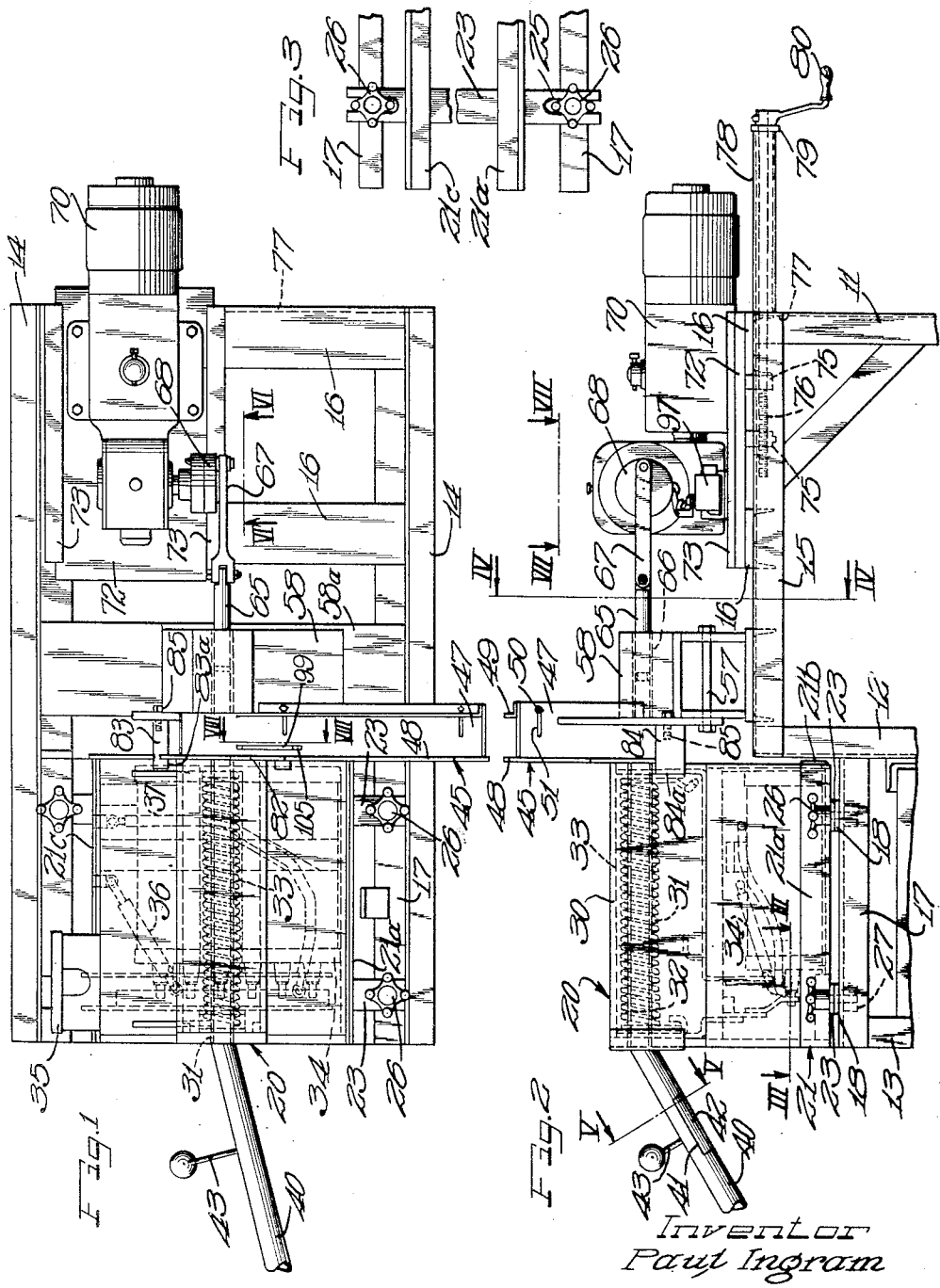
Inventor
Paul Ingram

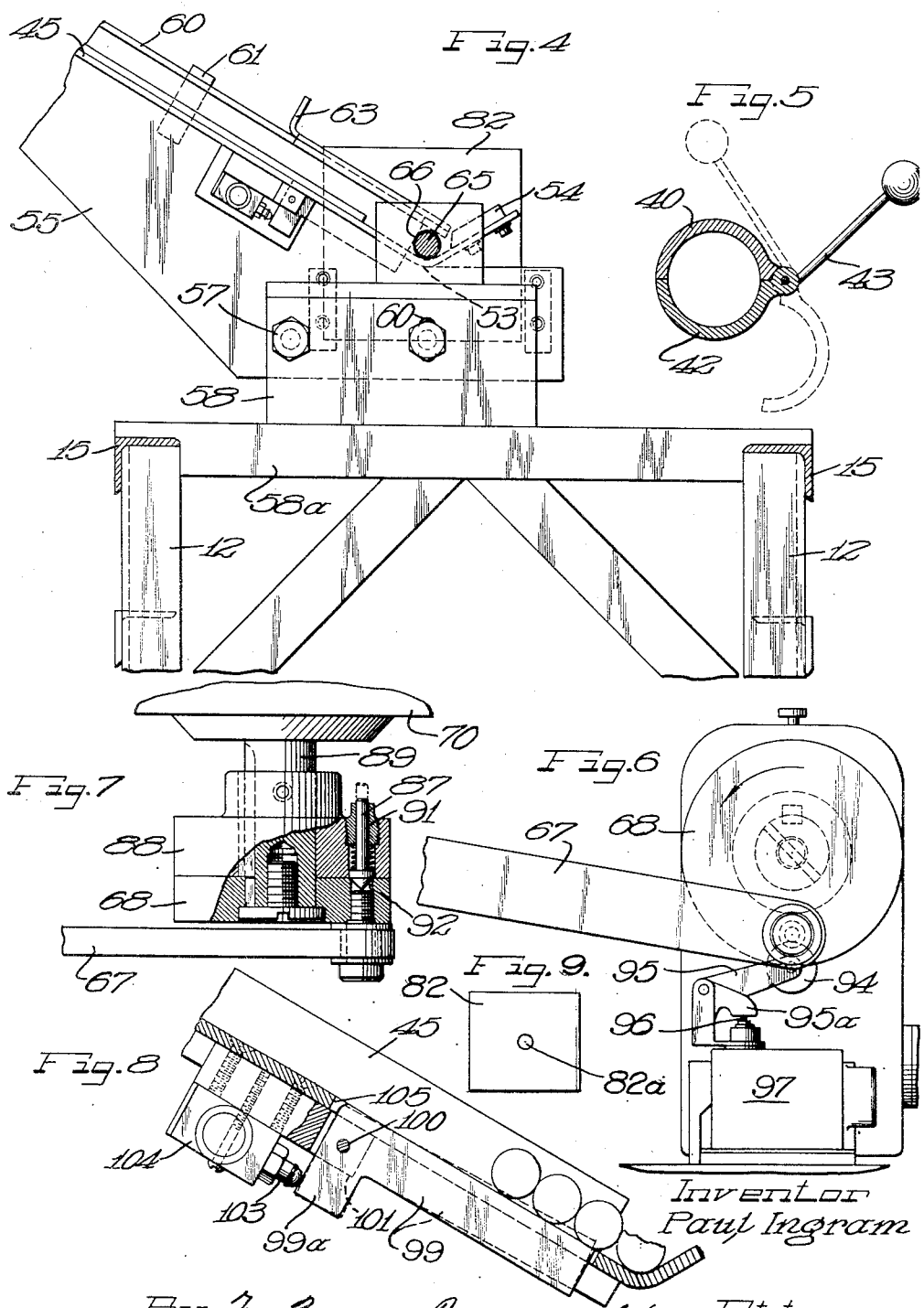

Patented Dec. 15, 1953

2,662,760

UNITED STATES PATENT OFFICE 2,662,760

SLUG FEED DEVICE

Paul Ingram, Cleveland, Ohio, assignor to Thompson Products, Inc., Cleveland, Ohio Application August 27, 1949, Serial No. 112,771

6 Claims. (Cl. 263—6)

This invention relates to a device for moving slugs of metal successively to a processing station. More particularly the invention deals with a device for feeding slugs of metal through an induction heating unit and for metering heated slugs to a press loading position at the discharge end of the heating unit.

In the die forging or extrusion of metal it is desirable to heat the metal piece to a relative high temperature just prior to loading the metal into the press. The metal should not be allowed to cool off too much at the loading station and, therefore, it is desirable that the metal slugs be delivered to the hand loading station at approximately the same rate as they are being loaded.

According to the teaching of the present invention, slugs of metal are fed in a gravity ramp that has a V-shaped lower open end located between and in axial alignment with a tubular passage through the heating unit and with a power-driven reciprocating push rod. As each slug moves into the V-shaped end, the push rod contacts it and forces it into the passage through the heating unit. As one slug enters the passage, a previous slug is pushed out at the other end into a chute which is directed to the loading station of the press. To regulate the rate of delivery of the slugs to the loading station of the press, the reciprocating push rod is driven through a variable speed transmission so that the speed of operation can be easily controlled. The heating unit employed has, of course, the necessary heating capacity to heat the slugs to the desired temperature. A safety switch mechanism, which is tripped to de-energize the heating coils and stop the movement of the push rod, is located in the inclined ramp. When the ramp is empty, the safety switch is tripped for preventing the over-heating of slugs that are already in the heating unit.

A second safety device is provided in the form of a metering plate disposed in front of the entrance of the furnace so that no oversize slugs of metal will pass into the furnace. When an oversize slug is stopped by this safety plate, a switch in the drive mechanism of the push rod is tripped to de-energize the power drive means.

It is, therefore, an important object of the present invention to provide a slug feed mechanism that may be readily adjusted for varying the rate of delivery of slugs through a heating unit.

Another object of this invention is the provision of a slug feed mechanism having a safety control for de-energizing the heating coils when the feeding ramp is empty.

A still further feature of this invention is the provision of means for preventing oversize slugs of metal from entering the heating unit and interconnected safety trip means for de-energizing the power means that pushes the slugs through the furnace.

Another object of this invention is to provide a slug feed device having readily removable parts, permitting substitution of parts to accommodate varying sizes of slugs.

While the slug feed device of this invention is particularly useful for feeding metal slugs through an induction heating furnace for subsequent delivery to the loading position of a press, it is to be understood that the invention is not to be limited to this installation since it has general application wherever articles are to be successively fed to an operating station.

Other and further features, objects and advantages of the present invention will become apparent to one skilled in the art from the following detailed description taken in connection with the accompanying drawings.

On the drawings:

Figure 1 is a top plan view of the slug feed device of the present invention;

Figure 2 is a fragmentary side elevational view of the slug feed device of Figure 1;

Figure 3 is a fragmentary plan view of a portion of the mechanism of Figure 2 taken on line III—III of Figure 2;

Figure 4 is a fragmentary vertical sectional view taken on line IV—IV of Figure 2;

Figure 5 is a sectional view taken on line V—V of Figure 2;

Figure 6 is an enlarged fragmentary elevational view of a portion of the mechanism of Figure 1 taken on line VI—VI of Figure 1;

Figure 7 is an enlarged fragmentary plan view of a portion of the device of Figure 2 taken on line VII—VII of Figure 2;

Figure 8 is a fragmentary vertical sectional view taken on line VIII—VIII of Figure 1; and Figure 9 is a detail view of a metering plate on a reduced scale.

As shown on the drawings:

In Figures 1, 2 and 3, the reference numeral 10 indicates generally a frame support structure having spaced pairs of upright leg members 11, 12 and 13 secured, as by welding, at their lower end to longitudinal angle members 14 at each side of the structure. At their upper end, the legs 11 and 12 are connected by longitudinal straps 15 which are in turn secured together by cross straps 16 to define an upper support platform. At the upper end of the leg 13, longitudinal angle members 17 rigidly connect the leg 13 to the leg 12 while spaced flat bars 18 are secured transversely of the structure to define a lower platform.

An induction heating unit 20 is suitably secured in a cradle 21 formed by three angle members 21a, 21b and 21c that are welded together. The unit 20 is supported on the lower platform on a pair of spaced cross straps 23 which are welded to the underside of the members 21a and 21c as shown in Figures 2 and 3. The straps 23 are slidably supported on the flat bars 18 which are located directly below. The ends of the cross straps 23 are provided with slots 25, Figure 3, through which adjusting screws 26 pass for threaded engagement in pads 27 secured to the under surface of the side longitudinal angle members 17. These slots permit transverse adjustment of the heating unit relative to the support structure when it is necessary to remove slugs from the furnace, or to replace a part of the heating unit.

The heating unit 20 comprises a housing 30 across the upper part of which is secured a ceramic tube 31 defining a passage 32 through which the metal slugs move. The upper part of the housing is preferably filled with plaster or the like around the tube 31. An induction heating coil 33 is wrapped around the tube 31 and is connected in a circuit with a capacitor 34 to a terminal box 35 secured to the side of the housing 30. Cooling liquid is supplied to the coil by conduits 36 and 37.

A tubular discharge chute 40 is suitably supported adjacent the housing 30 at the end of the passage 32. Thus, metal slugs leaving the passage are deposited in the chute and directed to the loading platform of the extrusion press. If the press is shut down for adjustment the slugs may be delivered through an opening 41 in the chute 40 which is normally closed by a pivotal gate 42 hingedly mounted on the chute 40 and having a handle 43 for easy manipulation. This by-pass is necessary so that the heating unit can be kept in operation during minor adjustment of the press so that no unnecessary delay will be incurred in reheating the cold slugs.

Metal slugs are directed to the entrant end of the passage 32 by means of a gravity feed ramp 45 that is inclined upwardly to the left as seen from the drive end of the machine in Figure 4. The ramp has a base 47, Figures 1 and 2, and an upstanding side wall 48 secured to the base. A second upstanding side wall 49 is slidably adjustable on the base 47 toward and away from the wall 48 by means of adjusting screws 50 disposed in a slot 51 in the base 47.

The ramp 45 has a V-shaped lower end portion 53, Figure 4, that holds the slug in alignment with the passage 32 as the slug is pushed thereinto. An adjustable stop 54 is mounted on top of the outer sloping side of the V end 53 to prevent the slugs from advancing up this side. The stop can be adjusted toward and away from the bottom of the V to accommodate slugs of different diameter and hold them in alignment with the passage 32.

The ramp 45 has a web portion 55, Figure 4, extending down from its bottom wall. This web is secured by bolts 57 to a guide housing 58 that has a base 58a extending transversely of the support structure and secured at its ends in the side longitudinal support straps 15. One of the bolts 57 passes through aligned vertical slots 60 in the housing 58 permitting the ramp 45 to be pivotally adjusted about the other bolt as an axis to accurately align the bottom of the V-shaped end with the entrance opening of the passage 32.

A cover 60 is adjustably secured on the ramp 45 in brackets 61. A door 62 is slidably disposed at the lower end of the cover 20 to facilitate removal of slugs which may cause a jam at the entrance of the passage 32.

The slugs are forced through the passage 32 by means of a push rod 65 that is slidably journaled in a longitudinal passage 66 in the guide housing 58 and is pivotally connected to a connecting rod 67. The connecting rod 67 is eccentrically connected to a rotating disc 68 that is driven from a source of power through a variable speed transmission 70.

The entire variable speed transmission 70 and the drive connection thereto are mounted on a plate 72, Figure 2, that is slidable longitudinally of the support structure in ways defined by the support structure and straps 73 suitably secured and spaced above the support structure. Ear members 75 depending from the bottom of the plate 72 have aligned threaded openings which receive a feed screw 76 which is journaled for rotation in a transverse structural frame member 77. A spacer sleeve 78 is disposed around the screw 76 between the structural member 77 and a shoulder 79 on the screw 76. As the screw is rotated in one direction by the hand wheel 80 attached thereto, the plate is moved longitudinally away from the guide housing 58. It will, of course, be recognized that for any given length of slug the movement of the connecting rod 67 must be such that the slug in the heating coil will be stopped just short of the exit of the passage 32. In the intermittent movement through the induction heating coil it is desirable that the slug be stopped inside of the coil just short of the exit of the passage 32 so that it will not cool off prior to being directed to the loading station of the press. Thus, it is necessary that the throw of the push rod 65 be adjustable for various sizes of slugs to get this desired effect. In the present invention this is accomplished by means of the slidable table mounting for the drive mechanism.

In order that the ceramic tube 31 defining the passage 32 be protected from damage due to oversize slugs, there is provided a safety plate 82 which is mounted by means of brackets 83 and 84 from the web portion 55 of the ramp 45 by means of bolts 85, as seen in Figures 1 and 2. The brackets 83 and 84 have hooked end portions 83a and 84a which extend around behind the safety plate to hold it firmly against the lower end of the ramp 45. The safety plate has an opening 82a, Figure 9, which is positioned directly in line with the V-shaped lower end 53 of the ramp 45 and with the passage 32. The opening 82a in the safety plate is of a predetermined diameter and it will accommodate only slugs of a certain size. Thus, for any size of slug the safety plate must be chosen accordingly. When an oversize slug is pushed forwardly by the push rod 65 it will abut the safety plate and will prevent the forward movement of the push rod 65.

In order to prevent any jamming or breaking apart there is provided a spring-urged safety pin 87, Figure 7, which is disposed in a hub portion 88 keyed to a shaft 89 extending from the variable speed transmission 70. Thus, during normal operation, the disc 68 is driven by the hub 88 through the spring-urged pin 87. This pin is adjustably held in the hub 88 by means of a threaded collar 91. The lower end of the pin 87 has a conical shape which extends into an opening 92 in the disc 68 for driving engagement therewith. When the forward movement of the push rod 65 and the connecting rod 67 is stopped due to the abutting of an oversize slug against the safety plate, the conical end portion of the pin 87 will ride out of the opening 92 and permit free rotation of the hub 88 relative to the disc 68. When the pin 87 is moved upwardly to dotted line position indicated in Figure 7, further rotation of the hub 88 will cause the raised pin 87 to contact a roller 94, Figure 6, which is mounted at the end of a bell crank 95 which has one end portion 95a in contact with the tripping element 96 of the switch 97. Thus, as the extended end of the pin 87 rotates with the freely rotating hub 88 it contacts the roller 94 and trips the switch to shut off power to the variable speed transmission. Thus, there is provided in this invention a safety means for shutting down the power-drive mechanism when an oversize slug contacts the safety plate.

Since each metal slug is moved through the heating passage 32 of the induction coil by the contact of a following slug, there is always at least one slug in the passage being heated. If the supply of slugs in the ramp 45 were to stop, the feeding of the slugs through the machine would stop in spite of the continued movement of the push rod 65. Therefore, there is provided in this invention an automatic trip means actuated by the weight of the slugs in the ramp 45 to shut off the power to the drive mechanism and to de-energize the heating coil when the ramp 45 becomes empty. This mechanism is shown in Figures 4 and 8 and comprises a lever 99 pivotally mounted by a pin 100 from an ear member 101 of the ramp 45 having one end 99a arranged to contact the plunger 103 of an electric switch 104. The lever 99 in normal operation extends upwardly through a slot 105, Figures 1 and 8. The weight of the slugs passing over this lever will cause it to pivot downwardly and push the push rod 103 to energize the circuit to the heating coil and the power drive mechanism of the variable speed transmission. When the ramp becomes empty and the last slug is deposited in the V-shaped end 53 the lever 99 will pivot upwardly permitting the spring-urged plunger 103 to move out of the switch 104 and de-energize the circuit to the heating coil and the power-drive means. Thus, this safety trip mechanism provides an automatic means for shutting off the power to the heating element and preventing melting of the slugs in the heating passage when they are temporarily detained therein.

From the foregoing description it will be seen that there is provided in this invention a very simple slug feeding device the rate of speed of which can be quickly varied to provide the exact rate of discharge of slugs from the heating unit that is required at the press. Further, there is provided in this invention automatic safety means for shutting down the power-drive means when an oversize slug is fed to the mechanism and also safety means for de-energizing the power-drive means and the heating element when the supply of slugs is stopped. This mechanism is also adjustable to provide a variable stroke mechanism so that the end of the stroke is correlated with the end of the heating passage so that the slug will always remain inside the passage during the interval just before it is discharged therefrom. Thus, no cooling of the slug in the passage will be effected. Another feature of this invention is the by-pass means in the discharge which permits the feeding mechanism to continue its operation even though the press is temporarily shut down thus obviating the re-heating of the cooled slugs in the heating coil.

It will be understood that modifications and variations may be effected without departing from the scope of the novel concepts of the present invention.

I claim as my invention:

1. A device for feeding slugs comprising a heating unit having a passageway for heating slugs therein, means for successively aligning slugs with said passageway, power means for pushing aligned slugs through said passageway, a metering plate having a slug receiving aperture smaller than the cross sectional area of the passageway adjacent the receiving end of said passageway preventing movement of oversize slugs thereinto, and a load responsive mechanism to stop said power means whenever said aperture does not freely receive a slug pushed by said power means.

2. A device for feeding slugs comprising a heating unit having a passageway therethrough, a push rod arranged to move slugs through said passageway, a rotatable disc pivotally holding one end of said push rod, a power driven disc rotatable on the same axis as said rotatable disc, each of said discs having an aperture therethrough, a spring-urged pin slidably disposed in the aperture in the power driven disc and having a conical point disposed in the aperture in the rotatable disc connecting the discs in driving relation, a switch adjacent said power driven disc for controlling the power thereto, and a metering plate adjacent the passageway to said heating unit preventing movement of oversize slugs thereinto, said spring urged pin being movable out of the passage in said rotating disc when an oversize slug is stopped by said metering plate and movable against said switch to deenergize said power driven disc.

3. A device for feeding slugs to a heating unit having a passageway comprising a metering plate having a sized orifice therethrough, said passageway being of larger cross sectional area and adjacent said plate, means for automatically delivering slugs to a position in front of said metering plate, a reciprocating pusher adapted to successively push slugs through the sized orifice in said metering plate into said passageway, power means for driving said reciprocating pusher, means for mechanically disengaging said power means from said pusher when an oversized slug jams against said metering plate, and means for shutting off said power means after said power means has been mechanically disengaged from said pusher.

4. In a slug feeding device including a heating unit having a passageway therethrough, a rod arranged to move slugs through said passageway and a rotatable disc to which said rod is eccentrically connected, a power-driven disc rotatable on the same axis as said rotatable disc, the power-driven disc having an opening therethrough, the first-mentioned disc having a recess therein, a pin disposed in said opening and having a beveled end portion engageable in said recess, spring means urging said pin into a first position in which the beveled end portion is disposed in said recess so that the discs are in driving relation, said pin being movable in an axial direction to a second position in which said discs are decoupled by obstruction of the movement of the first-mentioned rotatable disc, a switch for controlling the power-driven disc, and an operating arm on said switch disposed in the path of movement of said arm in its second position.

5. In a slug feeding device, a unit having an open-ended generally horizontal passageway therethrough, means for heating slugs in said passageway, an inclined ramp adjacent one end of said passageway and having a lower trough portion aligned with said passageway, a reciprocable plunger aligned with said passageway and said trough portion, means for operating said plunger, mechanism for varying the end of stroke of said plunger relative to said one open end of said passageway for determining the position of slugs adjacent the other open end of said passageway prior to ejection therefrom to maintain the entire lengths of the slugs in the passageway until the leading slug is discharged from said other end, a metering plate adjacent said one end of said passageway and having an aperture smaller than the smallest cross-section of said passageway to prevent jamming of slugs therein, and load responsive mechanism to stop the means for operating the plunger upon jamming of a slug in said aperture.

6. In a slug feeding device, a unit having an open-ended generally horizontal passageway therethrough, means for heating slugs in said passageway, an inclined ramp adjacent one end of said passageway and having a lower trough portion aligned with said passageway, a reciprocable plunger aligned with said passageway and said trough portion, means for operating said plunger and adjustable for varying the end of stroke of said plunger relative to said one end of said passageway and for determining the position of slugs adjacent the other end of said passageway prior to ejection therefrom, and a metering plate adjacent said one end of said passageway and having an aperture smaller than the smallest cross-section of said passageway to prevent jamming of slugs therein, said plunger operating means including a clutch operative to disengaged position upon a predetermined transmitted force to prevent damage to the device.

PAUL INGRAM.

References Cited in the file of this patent
UNITED STATES PATENTS

| Number | Name | Date |
|---|---|---|
| 1,075,891 | Ayars | Oct. 14, 1913 |
| 1,125,105 | Insley | Jan. 19, 1915 |
| 1,252,561 | Fassinger | Jan. 8, 1918 |
| 1,412,444 | Baker et al. | Apr. 11, 1922 |
| 1,563,365 | Hollup | Dec. 1, 1925 |
| 1,583,889 | Lariviere | May 11, 1926 |
| 1,799,106 | Laxo | Mar. 31, 1931 |
| 1,913,665 | Frink | June 13, 1933 |
| 1,986,802 | Friedemann | Jan. 8, 1935 |
| 2,078,905 | Fearnside | Apr. 27, 1937 |
| 2,256,781 | Nelson | Sept. 23, 1941 |
| 2,325,638 | Strickland | Aug. 3, 1943 |
| 2,556,234 | Strickland, Jr. | June 12, 1951 |
| 2,563,883 | Strickland, Jr. | Aug. 14, 1951 |
| 2,572,073 | Strickland, Jr. | Oct. 23, 1951 |
| 2,578,760 | Strickland, Jr. | Dec. 18, 1951 |
| 2,604,577 | Strickland, Jr., et al. | July 22, 1952 |
| 2,644,075 | Corteggiano et al. | June 30, 1953 |